United States Patent Office 3,410,248
Patented Nov. 12, 1968

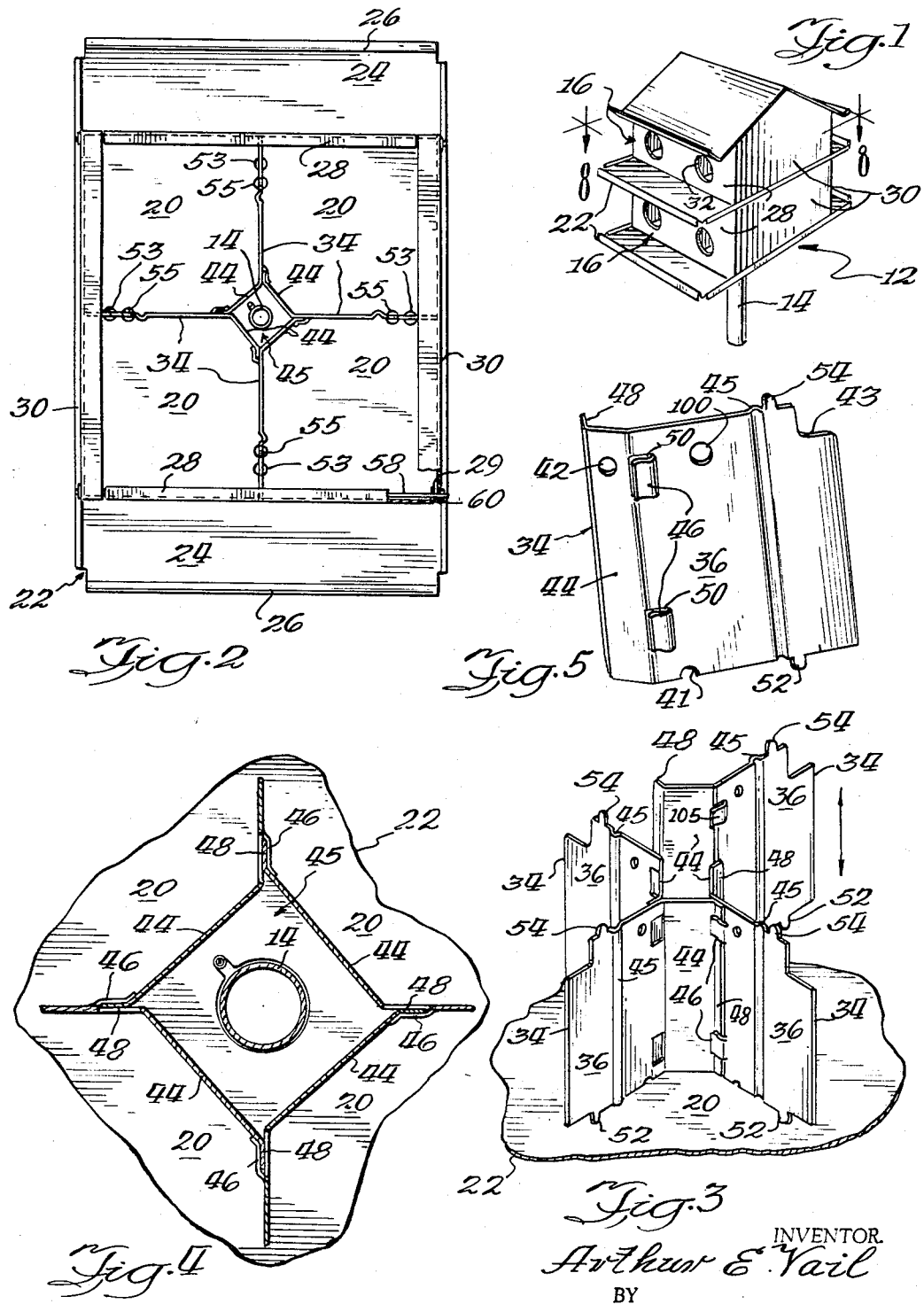

3,410,248
BIRD HOUSE
Arthur E. Vail, Griggsville, Ill., assignor to Trio Manufacturing Company, Griggsville, Ill., a corporation of Illinois
Filed Oct. 25, 1966, Ser. No. 589,254
8 Claims. (Cl. 119—23)

ABSTRACT OF THE DISCLOSURE

A multiple dwelling bird house comprised of one or more tiers, each having a plurality of individual nesting compartments. The respective tiers include a floor, outer wall structure provided with apertures to permit the ingress and egress of the birds, and inner wall structure which defines the individual nesting compartments; the floor of an upper tier defining the ceiling or upper extremity of the lower, adjacent tier. The inner wall structure being comprised of a plurality of identical shaped structural elements. Each of said elements having a planar wall portion, an intermediate wall portion and unitary male and female type connecting means provided thereon, whereby when assembled the female type connecting means of one of said elements receives the male type connecting means and the element disposed on one side thereof, while the male type connecting means of said one element is received by the female type connecting means of an element disposed of the opposite side thereof.

---

This invention relates generally to bird houses, and more particularly, to an improved construction of a multi-apartment type bird house adapted to be fabricated from lightweight sheet material.

Although not necessarily limited thereto, the bird house embodiment of the invention is especially effective in attracting and housing a species of birds known as martins. Martins are a gregarious species and prodigious and effective destroyers of flying insect pests such as mosquitos, to such an extent that it is desirable to attract colonies of these birds to residential areas to provide for pest control. It is known, for instance, that the average martin will destroy upwards of 2,000 mosquitoes daily.

Martins winter in South America each year and upon northward migration will return to nest in the same bird house year after year, provided the bird house is clean of the nests and trash of other birds which have used the bird house in the meantime. Further, since the martin is a rather particular bird, the bird house construction, ventilation and shape of the individual nesting compartments must be suited to their liking before they will nest. It has been discovered that compartments which measure approximately 6″ x 6″ x 6″ seem to be preferred by the martin. These features are extremely desirable since the martin dislikes to have his tail feathers ruffled and prefers a compartment that is spacious and well ventilated.

As the public has become more aware of the value of martins and other birds which prey on insect pests, it is not uncommon today for individuals, civic groups and service clubs to embark upon programs designed to attract these beneficial birds to residential areas. This activity has created an increased demand for a bird house that is easy to assemble and maintain by the home owner, for instance, and which can be produced in great quantities economically by modern day mass production methods. One type of martin house that was specifically designed for martins and which has met with great success in attracting colonies of these birds, is that disclosed in U.S. Reissue Patent No. 25,878.

Accordingly, it is the primary object of this invention to provide a bird house which is easy to construct and assemble from relatively inexpensive, lightweight material and which utilizes the principles of mass production, namely, the duplication of parts to keep the total number of stock parts needed to construct the bird house at a minimum.

Still another object of the invention is the provision of a structural element that will provide for the duplication of parts above mentioned and more fully detailed hereinafter.

A further object of the invention is the provision of novel construction, integral with the floor or base of the house which provides a perch for the birds.

The above enumerated objects and other objects, advantages, and functions of the invention will become apparent upon reference to the following detailed description of the invention and the attached drawings, in which like parts are indicated by like reference symbols in each view, and in which:

FIG. 1 is a perspective view of one form of bird house embodying the invention.

FIG. 2 is a sectional view taken along the lines 2—2 of FIG. 1 and in the direction indicated, and showing the interlocking relationship of the inner wall members.

FIG. 3 is a perspective view of the inner wall assemblage of the modified form of bird house shown in FIGS. 1 and 2, showing the preferred method of assembly of the interlocking inner wall elements.

FIG. 4 is an enlarged fragmentary sectional view of the inner ends of the inner wall members in interlocking relationship.

FIG. 5 is a perspective view of an individual inner wall element shown in FIG. 3.

In FIGS. 1–5, there is illustrated one form of bird house embodying the invention. The bird house is designated generally 12 in FIG. 1, and is illustrated mounted on a pole 14. In the illustrated form of the invention the bird house is generally rectangular in shape and is provided with a plurality of tiers 16 which are detachably secured together. The bird house 12 is preferably constructed of lightweight sheet material, such as sheet aluminum.

Each tier 16 is comprised of four individual nesting compartments 20 which have a common floor 22. The floor 22 extends outwardly beyond the opposite ends of the bird house to provide balconies 24 and has a central aperture 23. The terminal ends of the floor 22 which form the balcony 24 are provided with upstanding, return bend flanges 26, which provides perches for the birds.

The outer walls of the compartments 20 are formed by two parallel pivotally mounted front panels 28 and two parallel stationary side panels 30 which are attached to the floor 22 in any desirable manner. The pivotally mounted front panels 28 are positioned adjacent the balconies 24 and are provided with apertures 32 which provide entrance means for the birds. As an alternative to the illustrated outer construction of the bird house it would be possible, and within the scope of the invention, to provide only one entrance aperture 32 in the pivotable panels 28, the other entrance aperture for the adjacent compartment being provided in the stationary side panels 30. Of course, with this form of outer construction it would be necessary to extend the floor 22 outwardly on all four sides to provide the requisite balconies. The invention will be described primarily with regard to the construction of the inner walls, it being intended that the outer construction of bird house can take any number of forms.

The inner wall structure of each compartment of the illustrated model is of three sided configuration and formed from a plurality of identically shaped interlocking structural elements 34. Each structural element 34 has a planar wall 36 which serves as a common side wall for adjacent compartments as best illustrated in FIG. 2. As shown in FIG. 5 the planar wall 36 may be provided with apertures or cutouts such as apertures 40, 41, 42 and cutout 43 to provide for proper ventilation of each compartment. Further, the planar wall 36 may be also be provided with a reinforcing rib 45. The identically shaped elements 34 are provided with an integral flange 44 disposed at an angle with respect to the planar wall 36, which serves as an intermediate or rear wall between two of the inner side walls 36. The four identically shaped inner structural elements are interlocked such that the intermediate walls 44 of the respective elements define an enclosed area 45, as illustrated in FIG. 4. This enclosed area 45 has two primary functions. First, it cooperates with the aperture in floor sections 22 to provide a reception space for the supporting pole 14. This feature is extremely desirable in that it provides for increased rigidity and resistance to wind damage. The second function of the enclosed area 46 is to provide a ventilation shaft for the compartments.

The identically shaped inner wall elements 34 are each provided with male and female type connecting means. The female type connecting means is in the form of a plurality of integral open end stamped or struck out portions 46, which cooperate with the planar wall 36 to define a channel or slot 50 immediately adjacent the point where the intermediate wall 44 and the planar wall 36 meet. The male type connecting means of the preferred form of the invention is provided by the intermediate wall portion 44 itself, which may have a flange or tongue 48 on the end thereof. The tongue 48 is an integral portion of the intermediate wall 44 and in the preferred form of the invention is disposed at an angle with respect thereto. The tongue or flange 48 is seated in the recess or channel 50 formed by the stamped or struck out portions 46 and a portion of the planar wall 36. This engagement effectively interlocks the two inner wall elements and is repeated with respect to the other structural elements 34 to fabricate the completed inner wall structure, this fabrication can best be viewed in FIG. 3. It can be seen that the channel 50 of female type coupling means on a first inner wall element 34 will receive the flange or tongue 48 of a second inner wall element 34 disposed on one side thereof, while the tongue 48 of the first inner wall element 34 is engaged in the slot or channel 50 of a third inner wall element disposed on the other side thereof.

Assembly of the inner wall structure of each tier to the floor 22 is accomplished by the use of tabs 52 and 54 on the lower and upper edges of the structural elements 34. The tabs 52 on the lower dege of element 34 are inserted in apertures 53 in the floor 22. The tabs 54 will be inserted in apertures provided in roof or floor 22 of the adjacent tier. With reference to FIG. 2 it can be seen that each floor section 22 is provided with a second set of apertures 55 which will receive the tabs 54 of the structural elements from the tier below. With the outer wall panels in place and the inner structural members 34 interlocked and assembled to the floor 22 there is thus provided a four-compartment tier which utilizes only four distinct or separate stock parts, namely, a floor 22, side panels 30, front panels 28 and the inner wall structural elements 34.

The pivotal mounting of the front panels 28 is illustrated in FIG. 2. Here a horizontal pin or bar 58 is passed through the walls of side panels 30 and through apertures in the brackets 29 which are formed integral with the front wall panels 28. Snap type fasteners 60 are then attached to each end of horizontal bar 58 to fix its position with respect to the side panels 30. The front panel 28 is thus pivotally mounted upon a horizontal axis defined by the bar 58 and permits the home owner to gain access to the compartments 20 for cleaning or other purposes.

The above described assemblage thus provides a basic tier structure that is constructed with a minimum number of stock parts. From this basic structure certain modified forms of construction will be readily apparent to those skilled in the art. One example has already been mentioned in regard to the placement of the entrance apertures 32. Another modification, within the scope of the invention and the appended claims, would involve the lengthening of any two diametrically opposed planar wall portions 46 and the provision of a pair of partitions parallel to the remaining two planar walls. This construction would provide an eight compartment tier as opposed to the four compartment model illustrated.

The invention thus provides an improved bird house which has proven to be attractive to martins as well as other species and also embodies a number of features which are advantageous to the home owner.

It will be apparent that various changes and modifications may be made in the construction and arrangements of the components of the bird house within the spirit and scope of the invention. It is intended that such changes and modifications be included within the scope of the appended claims.

What it is desired to be secured by Letters Patent of the United States is:

1. A multiple bird house having a plurality of individual nesting compartments and a floor beneath said compartments, means providing an apertured outer wall structure to permit the ingress and egress of the birds, an inner wall structure comprised of a plurality of identically shaped structural elements which cooperate to define said individual compartments, each of said elements including a planar wall section having an outer end associated with said outer wall structure and serving as a common wall for adjacent compartments, the inner portion of each of said elements including an angularly disposed intermediate wall having unitary male type connecting means thereon, and female type connecting means provided on said element approximate said intermediate wall, each of said identically shaped elements positioned whereby said female type connecting means receive the male type connecting means of the element disposed on one side thereof while the male type connecting means is received in the female type connecting means of the element disposed on the other side thereof, and means associated with the upper edge of said identically shaped elements and said outer wall structure to define the upper extremities of said compartments.

2. A multiple bird house as set forth in claim 1 wherein said intermediate wall is disposed at an obtuse angle with respect to the planar wall member whereby the respective intermediate wall sections cooperate to define an enclosed inner area that is separate from the individual nesting compartments.

3. A multiple bird house as set forth in claim 2 wherein the floor and means defining the upper extremities of the compartment are provided with apertures aligned with said enclosed inner area for engaging a supporting pole therein.

4. A multiple bird house as set forth in claim 1 wherein said female type connecting means comprises said planar wall section having a plurality of struck out portions which cooperate with said section to define a channel having an open end for reception of said male type connecting means.

5. A multiple bird house as set forth in claim 1 wherein the floor extends beyond the individual nesting compartments to provide a balcony.

6. A multiple bird house as set forth in claim 5 wherein the edge of said floor is provided with an upstanding return bend flange which provides a perch for the birds.

7. A multiple dwelling bird house as set forth in claim 1 wherein the means defining the outer wall structure is of four sided configuration and comprised of four planar outer wall panels, two of said outer wall panels being parallel and fixedly attached to the floor, the other two outer wall panels being hingedly connected with respect to said fixedly attached outer wall panels to provide access means to the interior of the individual nesting compartments.

8. A structural element for use in the construction of a multiple dwelling bird house wherein the inner wall assembly of said bird house is comprised of a plurality of said structural elements which cooperate to define individual nesting compartments, said structural element comprising: a planar wall section adapted to serve as a common wall for adjacent compartments, an angularly disposed intermediate wall formed on the inner portion of said element and having unitary male type connecting means thereon, and female type connecting means comprised of a plurality of integral open end portions struck out of said planar wall section and cooperating therewith to provide a channel adapted to receive the male type connecting means, whereby a plurality of said elements may be positioned such that the female type connecting means of each element receives a male type connecting means of the element disposed on one side thereof, while the male type connecting means of each element is received by the female type connecting means of the element disposed on the opposite side thereof.

References Cited

UNITED STATES PATENTS

| | | | |
|---|---|---|---|
| 1,916,878 | 7/1933 | Anklam | 119—23 |
| 2,841,919 | 7/1958 | McNeill | 46—30 |
| 3,111,934 | 11/1963 | Vail | 119—23 |

HUGH R. CHAMBLEE, *Primary Examiner.*